April 1, 1952     H. J. HUNSAKER ET AL     2,591,435
TRACTOR HOIST
Filed Feb. 23, 1945
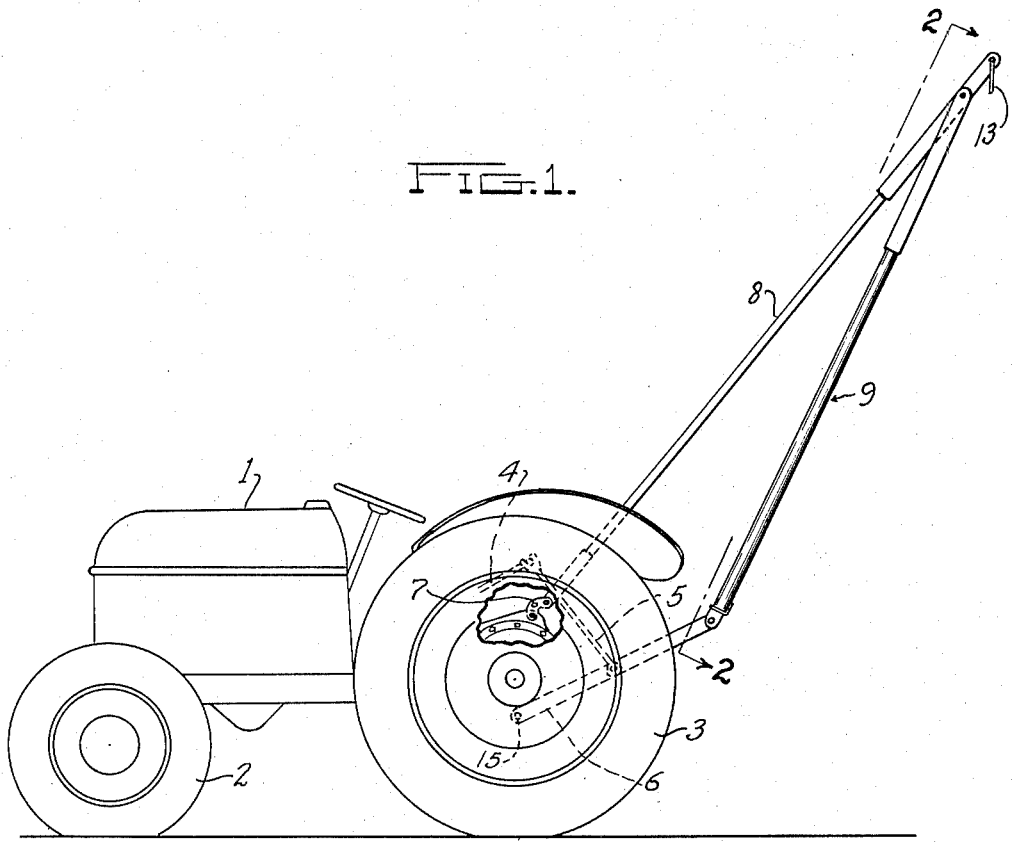
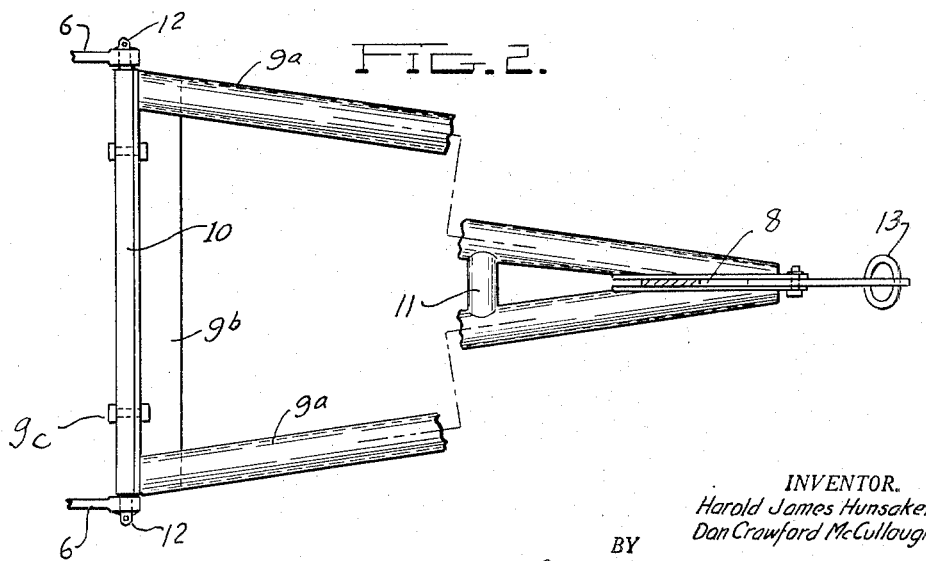
INVENTOR.
Harold James Hunsaker
Dan Crawford McCullough

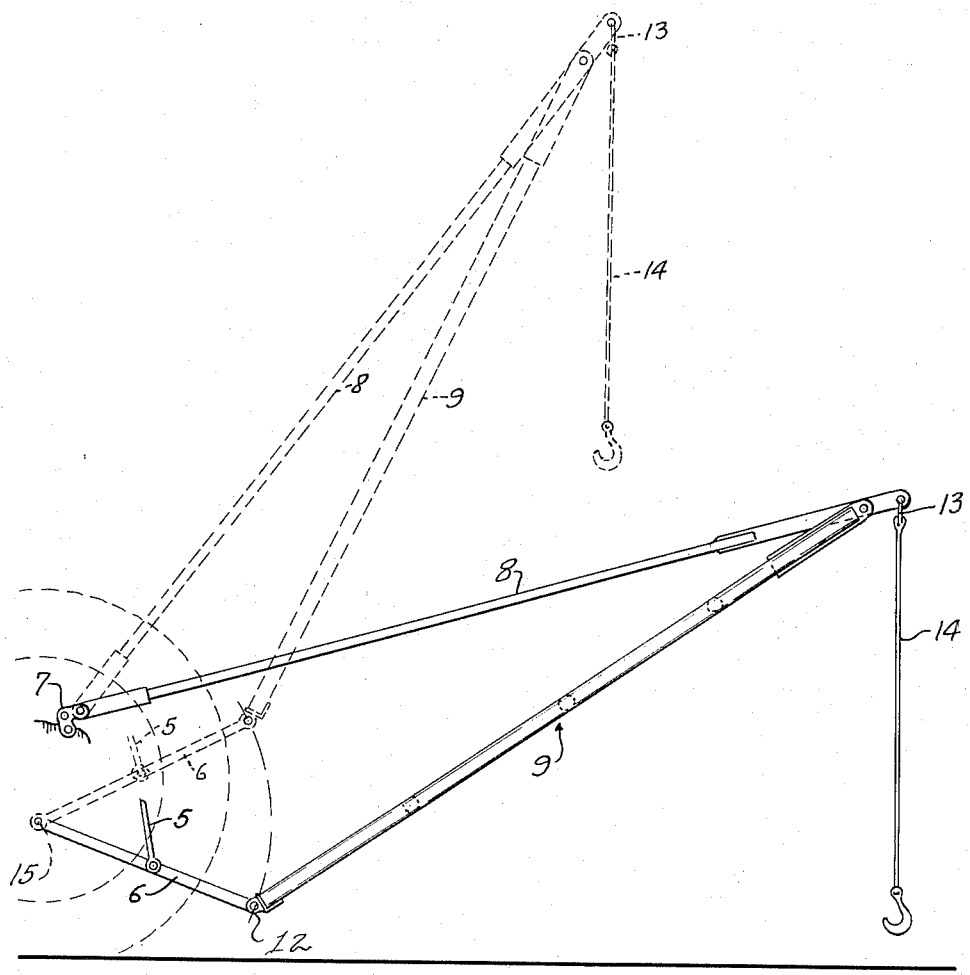

Patented Apr. 1, 1952

2,591,435

UNITED STATES PATENT OFFICE 2,591,435

TRACTOR HOIST

Harold James Hunsaker, Dallas, Tex., and Dan Crawford McCullough, Dearborn, Mich., assignors to Harry Ferguson, Inc., Dearborn, Mich., a corporation of Delaware Application February 23, 1945, Serial No. 579,400

7 Claims. (Cl. 212—8)

This invention relates to a tractor hoist and particularly a hoist that is arranged to be detachably connected with and actuated by a lifting member carried on the tractor. It is especially adaptable for connection with a "Ferguson" hitch used on a Ford tractor.

The object of the invention is to provide a new and improved device of this nature that is simple in construction, may be easily attached to a tractor lifting mechanism and which embodies a relationship of elements that produces a mechanical advantage in the operation thereof.

Figure 1 is a side elevation of a Ford tractor equipped with a "Ferguson" hitch and provided with our improved hoist;

Figure 2 is a fragmentary plan view of the hoist;

Figure 3 is a diagrammatic view showing the action of the hoist.

The hoist is particularly adapted for mounting on a tractor 1 having front wheels 2 and rear traction wheels 3. This tractor is provided with the well known "Ferguson" hitch which includes transversely spaced lifting arms 4, connected by lifting links 5 with lower draft links 6. 7 is a swinging support or shackle by which a part of a depth control and overload releasing mechanism (not shown) is attached. This much of the hitch is shown and described in the Ferguson Patent No. 2,118,180. It is not necessary to describe the details of the depth control mechanism here because so far as the operation of the hoist is concerned the depth control mechanism is inactive and only the lift means above described is used.

As shown and described in the aforesaid Ferguson patent, there is ordinarily attached to the shackle 7 of the hitch an upper or compression link, but here that link is removed to permit the connection of an elongate tension member or rod 8 to the tractor through the shackles. The tension member forms one part of the hoist structure. A boom 9, in the form of a triangular frame (see Fig. 2), is arranged for connection with the outer ends of the lower links 6. Forming this frame are two forwardly diverging side arms 9a rigidly connected at their spaced ends by a cross member 9b preferably in the form of an angle iron section appropriately perforated for connection by bolts 9c with the usual drawbar 10 of the hitch. The drawbar is mounted in the Ferguson hitch by transversely extending pivot pins or trunnions 12 engaging ball and socket joints carried by the ends of the draft links 6. Transverse struts or cross bars 11 reinforce the frame 9 along its length.

The apex of the frame is pivotally connected with the tension member 8 adjacent its rear end, this end being flattened (see Fig. 2) to fit between the arms of a yoke formed by the outer ends of the frame arms 9a. Preferably the tension member extends beyond the yoke so that its end may carry such means as an eye or ring 13 for connection with a hoist chain or cable 14.

It will be noted in Figs. 1 and 3 that the pivot points 15, about which the draft links 6 swing, are so related with respect to the bell crank lever 7 and the pivot for the upper link or tension member 8, that the draft links 6 in their upward movement swing toward the upper pivot. Since the draft links 6, the boom 9, the tension member 8 and the portion of the tractor between the pivotal points 7 and 15 form a quadrilateral figure, the vertical movement of the draft links tends to collapse the figure thereby producing a toggle like action of the draft links 6 and boom 9. Thus, as the hoist swings upwardly (as from the full to the dotted outline positions of Fig. 3) the movement of the draft links toward the tension member pivot 7 straightens the angle between the boom and the draft links. This results in a mechanical advantage in the operation of the hoist in that the lifting force available at the outer end of the hoist is substantially increased over that which could be obtained by a straight beam of the same overall length having a fixed relation to the draft links. It may be noted that the angular relation of the boom to the links disposes the outer end of the hoist a substantial distance above ground level when the links 6 are in their lowermost position whereby to afford ample clearance to the object to be lifted. This is advantageous in systems of the type herein illustrated wherein the lifting elements (i. e. the lower links 6) have such a lowermost position (shown in full lines in Fig. 3) that a boom arranged as a continuation of the links 6 would limit the downward movement and thus prevent the links from swinging through their full range.

Where greater hoisting power is required to handle heavier loads the lifting cable 14 may be attached to a suitable one of the cross bars 11.

This hoist is very simple and effective and may be easily attached to the "Ferguson" hitch by bolting the cross member 9b of the boom frame to the draft bar 10 of the hitch and by substituting the tension member 8 of the hoist for the customary upper compression link of the hitch. If expedient the draft bar 10 and base member 9b may be integral or permanently joined in which case the assembly thereof would be by the insertion of the pivot pins 12 through bores provided in the balls of the universal joint.

What we claim is:

1. In a hoist attachment for a tractor having laterally spaced draft links trailingly pivoted on its rear end portion and swingable vertically by a power device on the tractor together with an upper pivot at a point generally above the points of fastening of said draft links, the combination comprising an A-shaped boom for projection upwardly and rearwardly with respect to said tractor, the legs of said A being braced to maintain them spaced apart an amount generally corresponding to the lateral spacing of said draft links, means for pivoting the lower ends of the legs of said A to the trailing end portions of the respective draft links, a tension member pivotally secured adjacent its rear end to the outboard end of said boom, and pivot means attached to the forward end of said tension member for attachment to the upper pivot on the tractor, the restraint provided by the tension member at the upper end of the boom upon lifting of the lower end of the boom by the draft links serving to effect fore and aft rocking of said boom, the combined pivot-to-pivot lengths of the boom and said draft links being sufficiently greater than the length of said tension member so that the toggle formed by said boom and said draft links moves toward a dead-center condition as said draft links reach their upper limit of movement.

2. In a hoist attachment for a tractor having draft links trailingly pivoted on its rear end portion and swingable vertically by a power device on the tractor together with an upper pivot at a point generally above the points of fastening of said draft links, the combination comprising a boom arranged to extend upwardly and rearwardly with respect to said tractor, means for pivoting the inboard end of said boom to the trailing end portions of the respective draft links, a tension member pivotally secured adjacent its rear end to the outboard end of said boom, and pivot means attached to the forward end of said tension member for attachment to said upper pivot on the tractor, the restraint provided by the tension member at the upper end of the boom upon lifting of the lower end of the boom by the draft links resulting from vertical swing of the latter serving to effect fore and aft rocking of said boom, the combined pivot-to-pivot lengths of the boom and said draft links being sufficiently greater than the length of said tension member so that the toggle formed by said boom and said draft links approaches but does not achieve the dead-center condition upon said draft links reaching their upper limit of movement.

3. In a hoist attachment for a tractor having power elevated draft links trailingly pivoted on its rear end portion and having a pivot connection arranged on its rear end portion above said links, the combination comprising a substantially rigid rod member including means at its inner end for detachable pivoting to said pivot connection, load supporting means at the outer end of said rigid rod member, means providing a pivot support intermediate the ends of said rod member, and a boom pivotally joining said pivot support and the trailing ends of said draft links for supporting said rod member in an upwardly and rearwardly extended position on said tractor, said boom and the draft links having a combined length greater than the pivot-to-pivot length of said rod member to produce progressive rotation of said rod member about the point of pivoting attachment to the tractor over the entire range of upward swinging movement of said power elevated draft links.

4. In a hoist attachment for a tractor having a pair of power elevated draft links trailingly pivoted on the rear end portion thereof and having an upper pivot connection arranged on said rear end portion above said links, the combination comprising an elongate rigid member having means at its inner end for detachably connecting the same to the upper pivot connection on the tractor for projection upwardly and outwardly from the tractor, said rigid member having a load support at its outer end, means including a supporting boom pivotally attached to said rigid member and detachably and pivotally connectable to the outer ends of said draft links, said supporting boom and the draft links having a combined length greater than the pivot-to-pivot length of said rigid member to impart to said rigid member vertical swinging movement about said pivot connection in response to vertical swing of said power elevated draft links while supporting said member from the latter links.

5. A lift device for tractors of the type having hydraulic lift mechanism including lift arms having one of their ends connected to said mechanism and a link having one end dependingly and pivotally connected to the other end of each of said arms comprising a longitudinally extending lever positioned adjacent the other end of each of said links and pivotally connected intermediate its ends to the latter end of each of said links, each of said levers having one of its ends pivotally connected to the tractor, a transverse drawbar carried by the levers at their other ends and pivotally connected thereto, an inclined link member including laterally spaced upstanding sides connected at their lower ends to the drawbar, and a lifting boom disposed above the levers and pivotally connected at its inner end to the tractor, said boom also being pivotally connected intermediately of its ends with the upstanding sides near the upper ends of the same and projecting outwardly beyond said link member.

6. In a hoist attachment for a tractor having power elevated draft links trailingly pivoted on its rear end portion and having a pivot connection arranged on its rear end portion above said links, the combination comprising a substantially rigid rod member including means at its inner end for detachable pivoting to said pivot connection, load supporting means at the outer end of said rigid rod member, means providing a pivot support intermediate the ends of said rod member, and a member pivotally joining said pivot support and the trailing ends of said draft links for supporting said rod member in an upwardly and rearwardly extended position on said tractor, said second named member and the draft links having a combined length greater than the pivot-to-pivot length of said rod member to produce progressive rotation of said rod member about the point of pivoting attachment to the tractor over the entire range of upward swinging movement of said power elevated draft links.

7. In a hoist attachment for a tractor having a pair of power elevated draft links trailingly pivoted on the rear end portion thereof and having an upper pivot connection arranged on said rear end portion above said links, the combination comprising an elongate rigid member having means at its inner end for detachably connecting the same to the upper pivot connection on the tractor for projection upwardly and outwardly from the tractor, said rigid member having a load support at its outer end, means including a supporting member pivotally attached to said rigid member and detachably and pivotally connectable to the outer ends of said draft links, said supporting member and the draft links having a combined length greater than the pivot-to-pivot length of said rigid member to impart to said rigid member vertical swinging movement about said pivot connection in response to vertical swing of said power elevated draft links while supporting said rigid member from the latter links.

HAROLD JAMES HUNSAKER.
DAN CRAWFORD McCULLOUGH.

REFERENCES CITED

The following references are of record in the file of this patent:

UNITED STATES PATENTS

| Number | Name | Date |
|---|---|---|
| 686,425 | Sommerfeld | Nov. 12, 1901 |
| 1,509,905 | Salyards et al. | Sept. 30, 1924 |
| 1,558,636 | Rutan | Oct. 27, 1925 |
| 1,629,592 | Staley | May 24, 1927 |
| 1,630,800 | Page | May 31, 1927 |
| 1,739,938 | Barnett | Dec. 17, 1929 |
| 2,118,180 | Ferguson | May 24, 1938 |
| 2,290,384 | Rowe | July 21, 1942 |
| 2,322,697 | Lawler | June 22, 1943 |
| 2,398,585 | Hayward | Apr. 16, 1946 |

FOREIGN PATENTS

| Number | Country | Date |
|---|---|---|
| 35,814 | Sweden | May 25, 1912 |